United States Patent

Gilbert et al.

Patent Number: 5,379,045
Date of Patent: Jan. 3, 1995

[54] SATPS MAPPING WITH ANGLE ORIENTATION CALIBRATOR

[75] Inventors: Charles Gilbert, Sunnyvale, Calif.; Steve Kersey, Elgin, Ill.; James M. Janky, Los Altos, Calif.

[73] Assignee: Trimble Navigation Limited, Sunnyvale, Calif.

[21] Appl. No.: 115,432

[22] Filed: Sep. 1, 1993

[51] Int. Cl.6 .............................................. G01S 5/08
[52] U.S. Cl. ..................................... 342/357; 342/352
[58] Field of Search ................................ 342/357, 352

[56] References Cited

U.S. PATENT DOCUMENTS

| | | | |
|---|---|---|---|
| 4,949,089 | 8/1990 | Ruszkowski, Jr. | 342/357 X |
| 5,185,610 | 2/1993 | Ward et al. | 342/357 |
| 5,194,871 | 3/1993 | Counselman, III | 342/357 |
| 5,233,357 | 8/1993 | Ingensand et al. | 342/352 |
| 5,252,982 | 10/1993 | Frei | 342/357 |

*Primary Examiner*—Mark Hellner
*Attorney, Agent, or Firm*—John Schipper

[57] ABSTRACT

Mobile system apparatus for accurately determining the location of a designated object, spaced apart from the apparatus, without having to approach the designated object. The invention uses a Satellite Positioning System (SATPS), such as GPS or GLONASS, to determine the SATPS location of a first reference SATPS station, whose location is known with high accuracy, and of a second mobile SATPS station. The second mobile SATPS station uses two SATPS signal antennas, spaced apart a known distance but arbitrarily oriented. SATPS antennas at the first and second SATPS stations each receive SATPS signals from a plurality of SATPS satellites that can be used to determine the location of each antenna. The location of each SATPS antenna may be determined using differential corrections for the location of the first SATPS station antenna. The locations of the two SATPS signal antennas at the second SATPS station define a baseline for purposes of determination angular orientation. This angular orientation information, plus information provided by angle and range readouts for the designated object from a rangefinder positioned adjacent to the second SATPS station, allows determination of the location of the designated object without requiring use of magnetic field-dependent instruments such as magnetic compasses that may be inaccurate when used adjacent to metal structures or sources of intense electromagnetic fields. Another approach uses triangulation of the designated object location from two or more spaced apart known locations of the second SATPS station and does not require angular orientation information. Information on the location of the designated object can be processed at the second SATPS station, at the first SATPS station, or at any other place that has SATPS signal processing equipment.

32 Claims, 5 Drawing Sheets

SATPS MAPPING WITH ANGLE ORIENTATION CALIBRATOR

FIELD OF THE INVENTION

This invention relates to portable Satellite Positioning Systems for mapping and to methods of computing location offsets for such systems.

BACKGROUND OF THE INVENTION

Development of receivers for Satellite Positioning Systems (SATPSs), such as Global Positioning System (GPS) receivers, with inaccuracies as small as a few centimeters has opened many survey and navigation activities to collection of position data using SATPS technology. High accuracy mapping using SATPS can be performed in real time, or the data can be post-processed.

An SATPS usually includes, at the minimum; an SATPS antenna that receives SATPS signals from a plurality (preferably four or more) SATPS satellites; an SATPS receiver/processor that receives and processes these signals from the antenna to estimate the present time and/or location of the system; and an information storage or output means to store this information, to display this information, or to deliver this time/location information to another entity for its subsequent use. The system location of the SATPS is usually the antenna location. An object to be mapped in a survey may not permit the the SATPS antenna to be positioned contiguous to or on top of the object. Examples of such objects include utility poles, buildings, signs, trees, motorized equipment, animal homes and habitats, and communications and radio tower structures. Where an SATPS has associated location inaccuracies of no more than a few centimeters, it is pointless to position the SATPS antenna several meters from the object to be mapped.

Some workers in this field have developed portable or semi-portable equipment that can be used to assist surveying of a given land parcel, although this equipment often requires line-of-sight measurements that are inconsistent with mapping of opaque or partly opaque structures such as buildings and towers.

A geodetic survey system using a digital phase meter is disclosed by Jaffe in U.S. Pat. No. 3,522,992. The apparatus measures distances and changes therein between a transmitter and a receiver, by combining, modulating and transmitting two laser beams having different frequencies and measuring their corresponding phase difference at the receiver. The modulated composite light beam is split by a dichroic mirror, and the phase and intensity of each of the two frequency component signals (modulated) is analyzed to determine an initial or reference modulated waveform. The reference waveform is compared with a subsequently received waveform having the same signal frequency to determine any changes in the transmitter-to-receiver optical distance or in the refractive index of the intervening transmission medium. This apparatus requires transmission of two or more light beams along a line of sight, and the apparatus does not appear to be portable.

In U.S. Pat. No. 3,619,499, Petrocelli discloses a surveying system that measures small displacements of a light source. The light source is attached to a movable body and is monitored by a television camera. The video image is approximately centered on an image screen, and most or all other ambient light is filtered out from the screen image. The number of raster sweeps from the edge of the screen to the edge of the light source image is counted so that a small or large movement of the light source is monitored as a corresponding displacement of the light source image on the screen.

A guidance system for an earth-working vehicle, such as a tractor, is disclosed in U.S. Pat. No. 4,244,123, issued to Lazure et al. A signal transmitter, such as a rotating laser beam source, is positioned in a field to be worked, and two signal receivers are positioned at fixed, spaced apart, longitudinal locations on the vehicle, to distinguish changes by the vehicle in two horizontal directions. The receivers determine and report on the present location and bearing of the vehicle, based on what may be a phase difference of the signals received at the two receivers.

U.S. Pat. No. 4,309,758, issued to Halsall et al, discloses an unmanned land vehicle guided by three omnidirectional light detectors carried on the vehicle. At least two spaced apart light sources must be provided off the vehicle, with each detector receiving light from two of the light sources. The vehicle bearing and location appear to be determined by signal phase differences for light from a common source arriving at the different detectors.

Gates et al, in U.S. Pat. Nos. 4,396,942 and U.S. Pat. No. 5,073,819, disclose method and apparatus for a video survey conducted by a television camera mounted on a top surface of a truck or other vehicle that moves along a road to be surveyed. The displated video image includes an electronically activated overlay image that provides a geometric baselines and allows actual distances to be estimated and/or video-recorded, using perspective views of the road as the truck moves along.

A guidance and control system for one or more land vehicles is disclosed in U.S. Pat. No. 4,647,784, issued to Stephens. Each vehicle generates and transmits a light beam that is reflected from each of two or more reflectors, each reflector having its own optical code (for example, stripes having different light reflectivities) and being oriented to reflect and return the light beam to a light detector carried by the vehicle. The returned light beams from each beam are analyzed to determine the present bearing of the vehicle.

U.S. Pat. No. 4,671,654, issued to Miyahara et al, discloses automatic surveying apparatus for surveying a route, to be used for a tunnel with curves therein. A laser beam is received at, and produces a light spot on, one or two projection screens. The light spot coordinates on a screen are determined by a screen image pick-up. Position and angular deviations from a desired route, of a moving target containing the laser light source, can be monitored and measured as the target moves along or adjacent to the desired route.

As disclosed by Goyet in U.S. Pat. No. 4,677,555, a rotating laser beam defines a reference plane for an earthworking vehicle, such as a pipelaying machine. Datum points, defined by several beacons fixed in the ground and indicating the pattern (bearing, elevation) to be followed by the vehicle, are provided. A microcomputer carried on the vehicle monitors the pattern actually followed by the vehicle.

Kamel et al, in U.S. Pat. Nos. 4,688,092 and U.S. Pat. No. 4,746,976, disclose a method for satellite navigation, using image pixels with precisely known corresponding latitude and longitude coordinates of a portion of a celestial body such as the Earth. A computer receives these images and generates a model of the satellite orbit, longitude, latitude and altitude as a function of time, with reference to the celestial body. A least squares algorithm converts the measurements into best-fit coordinates.

A method of automatically steering a land vehicle, such as a tractor, along a selected course in a field is disclosed in U.S. Pat. No. 4,700,301, issued to Dyke. A rotating laser beam source and directional light detector/processor are mounted on the vehicle, and two or more reflectors are positioned at or near the boundary of the field. The laser beam is reflected from the reflectors, returns toward the vehicle, and is received by the detector/processor, which determines the present location of the vehicle and its present bearing. In another alternative, two rotating laser beam sources are positioned near the edge of the field, the the laser beams emitted by these sources are received by an omni-directional light detector carried on the vehicle.

Use of a rotating laser beam for two-dimensional navigation of a land vehicle in a specified region is also disclosed by Boultinghouse et al in U.S. Pat. No. 4,796,198. Three or more reflectors, one having a distinctive reflectivity, are positioned near the boundary of the region reflect the laser beam back to the vehicle, where the reflected beams are received by a photoelectric cell and generate signals with associated beam arrival directions that allow determination of the present location of the vehicle. Distinctive reflection from the one mirror provides an indication of the angular position of the laser beam on each rotation.

U.S. Pat. No. 4,807,131, issued to Clegg, discloses an automated land grading system in which the position of a cutting blade is controlled automatically to provide controlled shaping of a land region being graded. A laser beam is projected in a predetermined pattern across the land region, and a laser detector carried on the grading machine receives the beam and approximately determines the location of the cutting blade and the blade angle and depth appropriate for grading that location in the land region. Information on the desired blade angle and depth is stored a microprocessor carried on the grading machine and is compared with the actual blade angle and depth to correct the blade orientation and elevation.

Olsen et al disclose survey apparatus for collection and processing of geophysical signals, using a Global Positioning System (GPS), a GPS base station and one or more data acquisition vehicles, in U.S. Pat. No. 4,814,711. Each vehicle carries geophysical measuring instruments, a GPS signal receiver and processor to determine present location, a visual display of present location, and radio communication equipment to transmit location information to the base station. The base station periodically polls and determines the present location of each vehicle, with reference to a selected survey course that a vehicle is to follow. The base station transmits commands to each vehicle to keep that vehicle on the selected course. Each vehicle also transmits results of the geophysical data it has measured to the base station for correlation and possible display at the base station. This apparatus requires continual tracking, control and correction of the course of each vehicle relative to the desired course and requires use of non-portable apparatus (a vehicle and its equipment) to provide the desired location and data measurements. All such measurements are transmitted to, and analyzed by, the stationary base station, and the measurements probably are accurate only to within a few meters.

U.S. Pat. Nos. 4,870,422 and U.S. Pat. No. 5,014,066, issued to Counselman, disclose method and apparatus for measuring the length of a baseline vector between two survey marks on the Earth's surface, using a GPS signal antenna, receiver and processor located at each mark to determine the location of at mark (accurate to within a few meters). The location data are determined using GPS carrier phase measurements at each survey mark and are transmitted to a base station for analysis to determine the baseline vector length between the two marks. This approach requires use of two spaced apart survey marks and a base station. Use of GPS signals from five or more GPS satellites and use of a surveying time interval of length $\Delta t \geq 5000$ seconds are required in order to reduce the mark location inaccuracies to a less than a centimeter.

Paramythioti et al, in U.S. Pat. No. 4,873,449, disclose method and apparatus for three-dimensional surveying, using triangulation and a laser beam that propagates along the perimeter of a triangle. A rotatable mirror, a component of the scene to be surveyed, and a light-sensing means are located at the three vertices of the triangle, and knowledge of the angles of orientation of the rotatable mirror and the camera allow determination of the location of the component of the scene presently being surveyed. Three fixed, spaced apart stations, including one station at the scene to be surveyed, and receipt of a line-of-sight light beam are required here.

Apparatus for determining compass headings, using two GPS antennas located at fixed positions aboard a ship or aircraft, is disclosed in U.S. Pat. No. 4,881,080, issued to Jablonski. The absolute positions of the GPS antennas, with the usual inaccuracies, are measured without use of differential GPS. A GPS receiver/processor receives the signals sensed by the GPS antennas and determines a compass heading of the ship or aircraft, based upon the known relative positions of the two antennas on the ship or aircraft. A similar configuration, applied to mapping of ocean currents from an aircraft, is disclosed by Young in U.S. Pat. No. 4,990,922.

Use of three or more GPS antennas, arranged in a collinear or non-collinear array on a body, to determine the attitude or angular position of the body, is disclosed by Hwang in U.S. Pat. No. 5,021,792 and by Timothy in U.S. Pat. No. 5,101,356.

Gaer, in U.S. Pat. No. 4,924,448, discloses survey apparatus and method for mapping a portion of an ocean bottom. Two ships, each equipped with identical GPS signal antennas, receivers and processors, move along two parallel routes a fixed distance apart on the surface of an ocean. Each ship takes radio soundings of a small region of the ocean bottom directly beneath itself and receives a reflected radio sound from that same region that is originally transmitted by the other ship. The depths of the region directly beneath each ship, as determined by each of the two radio sound waveforms and by the GPS-determined locations of the two ships, are determined and compared for purposes of calibration.

A portable target indicator system, for use in a battlefield, is disclosed by Ruszkowski in U.S. Pat. No. 4,949,089. The target locator system includes GPS antenna and receiver/processor, a radio transmitter, a laser rangefinder and azimuth angle indicator. A rifleman carries the system into the battlefield and directs the laser rangefinder at a target. The radio transmitter transmits the rifleman's GPD-determined location and the offset location of the target relative to the rifleman to another entity, such as an aircraft, that has a weapons delivery system to be used against the target.

In U.S. Pat. No. 4,954,833, issued to Evans et al, a method for determining the location of a selected and fixed target or site, using a combination of GPS signals and the local direction of gravitational force. Geodetic azimuth is determined using GPS signals, and the local gravitational force vector is used to relate this location to an astronomy azimuth, using a fixed coordinate system that is independent of the local coordinate system. The target and a reference site are each provided with a GPS signal antenna, receiver and processor to determine the local geodetic azimuth.

Evans, in U.S. Pat. No. 5,030,957, discloses a method for simultaneously measuring orthometric and geometric heights of a site on the Earth's surface. Two or more leveling rods held at fixed, spaced apart locations, with a known baseline vector between the rods. Each rod holds a GPS signal antenna, receiver and processor that determines a GPS location for each rod. The geometric height of the GPS antenna (or of the intersection of the rod with the Earth's surface) is determined for each rod, and the geometric height difference is determined, using standard GPS measurements (accurate to within a few meters). The orthometric height difference for each GPS antenna is determined using the measured GPS location of each rod and an ellipsoid or geoid that approximates the local shape of the Earth's surface.

Method and apparatus for surveying the length, width, height and local slope of a road is disclosed by Gebel in U.S. Pat. No. 5,075,772. A sequence of equally spaced optical markers must be positioned along the road, and these markers are sensed by two video cameras and/or electromagnetic sensors, mounted on a vehicle and directed at the road surface, as the vehicle moves along the road.

A surveying instrument that uses GPS measurements for determining location of a terrestrial site that is not necessarily within a line-of-sight of the surveyor is disclosed in U.S. Pat. No. 5,077,557, issued to Ingensand. The instrument uses a GPS signal antenna, receiver and processor, combined with a conventional electro-optical or ultrasonic range finder and a local magnetic field vector sensor, at the surveyor's location. The range finder is used to determine the distance to a selected mark that is provided with a signal reflector to return a signal issued by the range finder to the range finder. The magnetic field vector sensor is apparently used to help determine the surveyor's location and to determine the angle of inclination from the surveyor's location to the selected mark.

In U.S. Pat. No. 5,146,231, Ghaem et al disclose an electronic direction finder that avoids reliance on sensing of terrestrial magnetic fields. The apparatus uses a directional antenna and receiver/processor for GPS or similar navigation signals received from a GPS satellite, and requires (stored) knowledge of the present location of at least one reference GPS satellite from which signals are received. The orientation of the finder or its housing relative to a line of sight vector from the finder to this reference satellite is determined. This orientation is visually displayed as a projection on a horizontal plane. Any other direction in this horizontal plane can then be determined with reference to this projection from a knowledge of the reference satellite location.

Spradley et al disclose a geodetic survey system using three or more fixed GPS base stations in U.S. Pat. No. 5,155,490. The location of each non-movable base station is known with high accuracy, and each base station has an atomic standard clock and GPS receiver/processor therein to determine GPS satellite clock offset and clock drift for each of several GPS satellites. A mobile station receives GPS signals and receives synchronized radio signals from each of the base stations, in a manner analogous to a LORAN system, and determines the present location and observation time for the mobile station.

With the exception of the Riszkowski and Ingensand approaches discussed above, none of the approaches discussed above is portable and self-contained and allows use in an arbitrary environment. Further, none of these approaches allows definition of baselines for the location determination equipment as the mapping proceeds. What is needed is a portable SATPS survey system that: (1) provides distance and bearing measurements from an observation site to an object to be mapped; (2) is not affected by the presence of a metallic structure that would severely compromise the accuracy of a magnetic compass used at the site; (3) does not require that any part of the survey system be positioned adjacent to or contiguous to the object; (4) can be applied to opaque, semi-opaque or transparent objects; (5) provides location data for an object with inaccuracies of at most a few meters; (6) provides one or more baselines for determination of object locations as the mapping proceeds; and (7) is flexible and can be used in almost any environment where at least a few SATPS satellites are visible.

SUMMARY OF THE INVENTION

These needs are met by the invention, which provides system apparatus and an associated method for accurately determining the location of a designated object that is separated by an arbitrary distance from the system equipment. The system first determines its own location, using differential SATPS signals that can be received and analyzed at two SATPS stations, one (reference) station having a known location and the other station being mobile or even portable. A vehicle containing the mobile SATPS station uses two SATPS antennas, separated by a fixed distance, so that a baseline or vector extending between these two antennas can be determined. A portable or hand-carried SATPS station may use one SATPS antenna or may use two SATPS antennas separated by a fixed distance. Use of two SATPS antennas, separated by a fixed distance, provides a baseline and baseline direction (e.g., a line passing through the centers of the two antennas) that replaces a baseline determined by a magnetic compass, where the compass information is suspect because of magnetic perturbations introduced by nearby large metal objects.

The length and angular orientation ("offset information") of a vector extending from one or both of the SATPS antennas to the object of interest art then determined, using optical, electro-optical, ultrasonic or other survey measurement means. The object location is then determined from knowledge of the SATPS antenna location and the offset information. The object location can be stored in an on-board memory, together with indicia identifying the object, or the object location and object indicia can be transmitted to a receiver for storage and/or further signal processing. The SATPS antennas and associated SATPS equipment can be mounted on a movable vehicle or can be carried into the field by a surveyor. An object to be mapped need only be visible from the surveyor's position and may be positioned at an arbitrary distance from the surveyor's position.

In one embodiment, the invention uses a Satellite Positioning System (SATPS), such as GPS or GLONASS, to determine the SATPS location of a first reference SATPS stations, whose location is known with high accuracy, and of a second portable and mobile SATPS station. The second SATPS station uses two SATPS signal antennas, positioned a fixed distance apart, to receive SATPS location determination signals from a plurality of SATPS satellites and to provide orientation of these two antennas relative to each other. Differential SATPS correction information for the first SATPS station may be used to correct the SATPS-determined location of the second station. Location determination means, positioned adjacent to the second station, visually determines the location of the designated object relative to the second station. The second station can be mounted on a vehicle, such as a truck or railroad car, or can be carried into and used in the field by a surveyor or mapper. Traditional methods of determining orientation, such as use of a magnetic compass, can be corrupted by the presence of a large metal-like structure, such as a vehicle body, but an SATPS is relatively unaffected by the presence of such bodies.

DESCRIPTION OF PREFERRED EMBODIMENTS OF THE INVENTION

Figure 1:
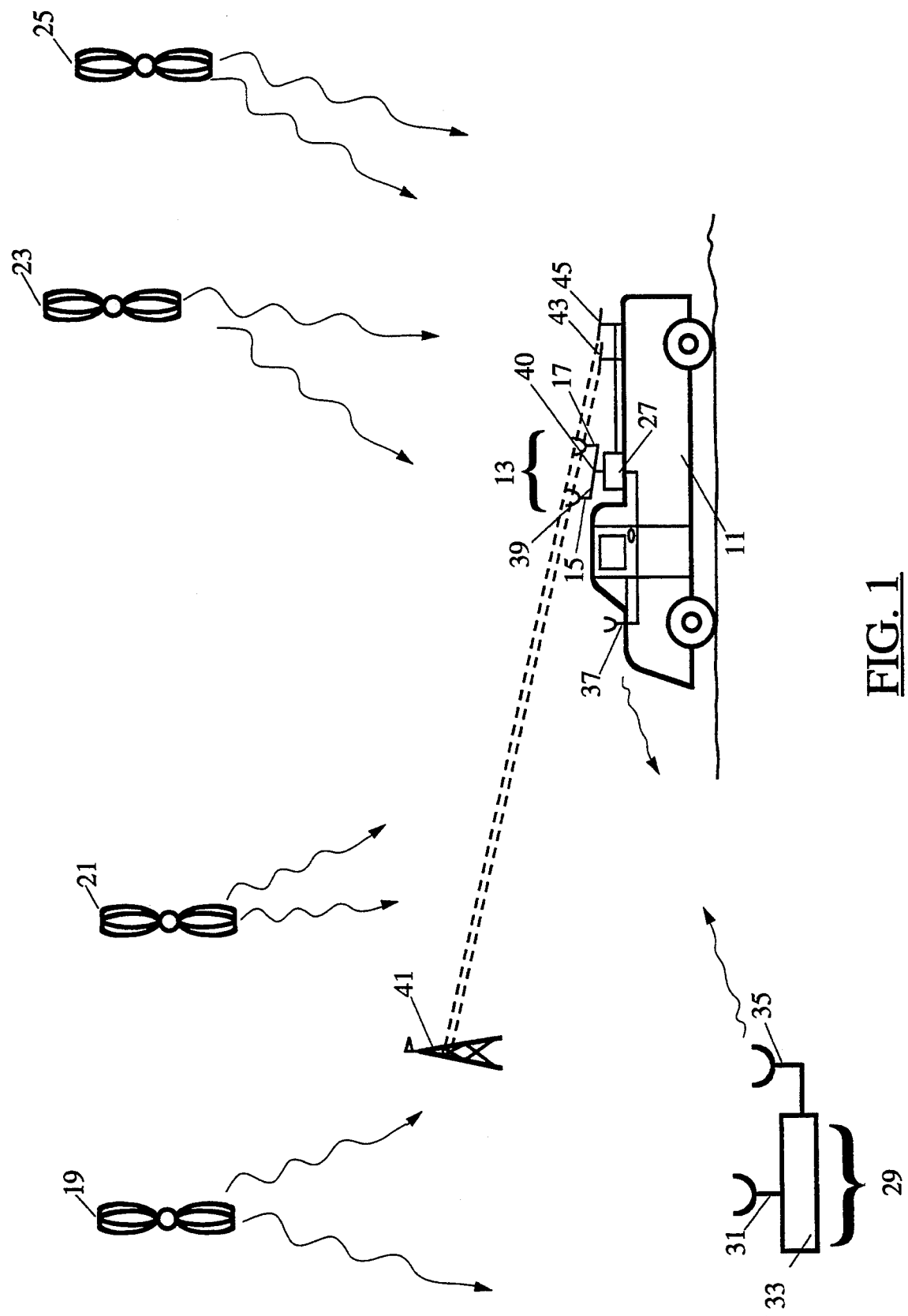
FIG. 1 is a schematic view of use of one embodiment of the invention.

The subject invention provides a portable survey baseline for performing SATPS-assisted surveys in the field. FIG. 1 illustrates one embodiment of this invention, in which a vehicle 11, such as a truck or a railroad car, carries an SATPS mobile station 13. The mobile station 13 includes first and second SATPS antennas 15 and 17, spaced apart a known distance d, that receive SATPS signals from four or more SATPS satellites 19, 21, 23 and 25. These SATPS signals are passed by the antennas 15 and 17 to an SATPS receiver/processor 27 that computes an SATPS-determined location of each of these antennas.

The two SATPS antennas 15 and 17 can be used to determine the length d and azimuthal angle $\phi$ (shown in FIG. 2) for the baseline that extends between the two antennas. The SATPS receiver/processor 27 can rapidly toggle between the two antennas 15 and 17, when necessary, and can independently compute a location for each of these antennas. When the location of each of these SATPS antennas is independently computed within a short time interval, using the same set of SATPS satellites for each determination, the (common) SATPS signal errors will be substantially identical. The unchanging antenna spacing d can be used to evaluate the quality of the determination of the azimuthal angle $\phi$. The azimuth angle information may be filtered or otherwise smoothed to stabilize or otherwise improve this information for subsequent use in determination of the azimuthal angle $\phi$ of the baseline relative to a selected line that intersects the baseline.

An SATPS reference station 29, whose location is known with high accuracy, is positioned in the vicinity of the mobile station 13 and also receives SATPS signals from the SATPS satellites 19, 21, 23 and 25 through another SATPS antenna 31 that is connected to another SATPS receiver/processor 33 that (1) measures the SATPS-determined pseudorange values at the reference station 29, (2) compares these pseudorange values with the known pseudorange values for the reference station 29, and (3) computes pseudorange corrections for the reference station that are the differences between these two sets of values. The reference station 29 has a correction signal transmitter 35 that transmits the SATPS pseudorange corrections. These pseudorange correction signals are received by a correction signal antenna that is connected to the mobile station receiver/processor 27. The receiver/processor 27 corrects the SATPS-determined location of one or both of the SATPS antennas 15 and 17, using the pseudorange correction information received by the correction signal antenna 37, in real time, or nearly real time. Using differential corrections for the SATPS-determined location coordinates of the antennas 15 and/or 17, the inaccuracies in these location coordinates can usually be reduced to a meter or less, which is acceptable location accuracy for mapping. If surveying is being performed, other procedures can be used to reduce the location inaccuracy to a few centimeters or less. The mobile station 13 can be separated from the reference station 29 by distances up to 500 kilometers (km). In practice, this separation distance is likely to be no more than 50 km.

The two SATPS antennas 15 and 17 are positioned at opposite ends of a baseline bar or other structure 39 of known, constant length d. Preferably, the length d is much greater than the smallest carrier wavelength used for the SATPS signals received from the SATPS satellites 19, 21, 23 and 25. The SATPS signals received by the mobile station 13 at the SATPS antennas 15 and 17 and SATPS receiver/processor 27 may be used for calibration or for determination of the most probable location of the first and second antennas 15 and 17.

Once the locations of the SATPS antennas 15 and 17 are determined, the location of an object 41, spaced apart from and visible from the mobile station 13, may be determined. The object 41 is simultaneously viewed by one or two angle-measuring and range-measuring ("ARM") devices 43 and 45, such as a single radar-type gun 43 that is pointed and fired at the object, with the round trip time $\Delta t_r$ for the return signal determining the range R from the radar-type gun to the object 41. Alternatively, one or two coordinated optical, electro-optical or ultrasonic devices 43 and 45 can be positioned adjacent to the respective antennas 15 and 17, using the known antenna separation distance d, the SATPS-determined locations of the antennas 15 and 17, and differential corrections for these antennas. If the locations of the SATPS antenna 15 and/or 17, the azimuthal angels $\phi_{43}$ and $\phi_{45}$ for each ARM device 43 and 45 to the object 41, and the polar angles $\theta_{43}$ and $\theta_{45}$ for each ARM device to the object 41 (illustrated in FIG. 3) are known, the offset location of the object 41 relative to the mobile station 13 can be determined by triangulation or other techniques. Optionally, one set of these angles, such as the polar angles $\theta_{43}$ and $\theta_{45}$, may be deleted here. The absolute location of the object 41 can then be determined by combining the location coordinates of the mobile station 13 and the object 41. Knowledge of several parameters allows the location of the object 41 to be determined: (1) separation distance d for the two SATPS antennas 15 and 17; (2) location coordinates of the SATPS antennas; (3) azimuthal angles and polar angles for the line-of-sight from each ARM device 43 and 45 to the object 41; and (4) offset coordinates for the ARM devices relative to the SATPS antennas.

The SATPS reference station 29, the transmitter/antenna 35 and the receiver/antenna 37 shown in FIG. 1 would be used if the SATPS location information for the antennas 15 and 17 and for the object 41 are to be processed in approximately real time. Such processing can occur at the SATPS mobile station receiver/processor 27.

Alternatively, such processing can occur at the SATPS reference station receiver/processor 33, if the transmitter 35 and the receiver 37 are exchanged so that the reference station 29 receives the raw or processed SATPS location information from the mobile station 13. The SATPS location information could be transmitted to the reference station 29 by the transmitter as this information is received from or through the SATPS receiver/processor 27.

Alternatively, the survey information (location of objects 41, direction of a survey reference line 57 (shown in FIGS. 2, 3 and 4), location of location determination means 43/45, etc/.) can be stored in the receiver/processor 27 and post-processed together with SATPS location information, contemporaneously measured, from a remote SATPS station such as 29. In this alternative, the receiver/processor 27 would be provided with a memory of adequate size, but provision of a transmitter or receiver 37 at the mobile station 13 would be unnecessary.

Using the apparatus illustrated in FIG. 1, the location of an object 41 that cannot be easily approached, or that is located in a hostile environment (such as a building that is on fire or is emitting hazardous fluid), can be determined without approaching the object.

Figure 2:
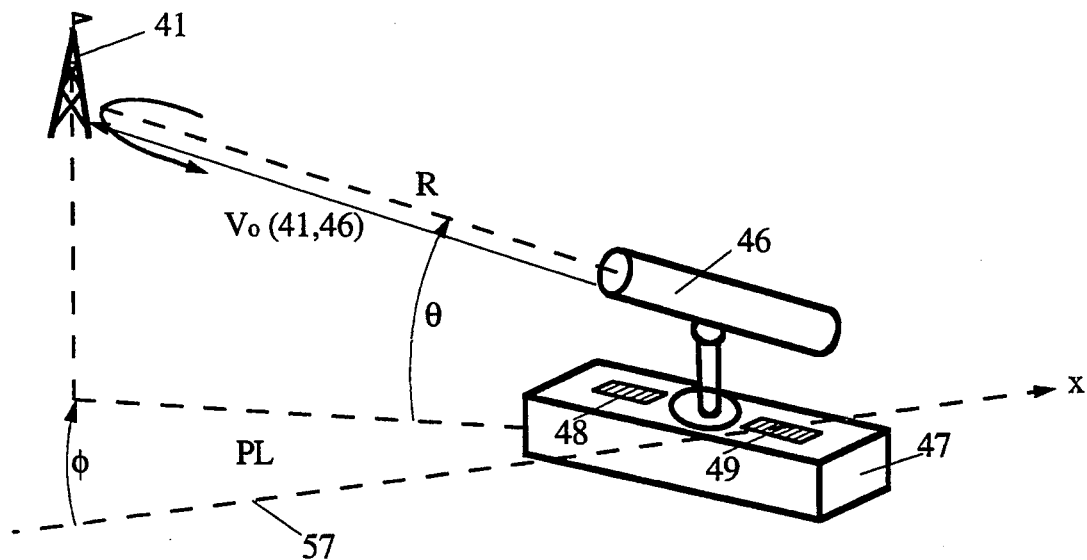
FIG. 2, 3 and 4 illustrate apparatus used to determine the location of a designated object relative to a portable survey station according to three embodiments of the invention.

FIG. 2 illustrates use of an ARM device that includes a radar-type gun 46 to determine the location of the object 41, using timed electromagnetic signal emissions with a selected frequency and sensing the time of arrival of a return signal that is reflected from the object. The radar gun 46 measures the range R and the angle coordinates of the object 41 relative to the ARM device. The radar gun 46 is rotatably mounted on a module 47 that measures the azimuthal angle $\phi$ and the polar angle $\theta$ of a vector $V_o(41, 46)$ extending from the radar gun to the object 41, relative to a selected plane PL passing through the radar gun location. Alternatively, this plane may pass through another definable point, such as a point on the Earth directly below the location of the radar gun 46, and the vertical offset of the radar gun relative to this latter point may be accounted for in the measurements. The azimuthal angle $\phi$ and the polar angle $\theta$ for each range measurement made by the radar gun 46 may be sensed and stored in a memory unit that is coordinated with or forms part of the receiver/processor 27; or these angle values may be visibly displayed on one or two angle readout panels 48 and 49. The range R or vector length $|V_o(41, 46)|$ from the radar gun 46 to the object 41 is determined by the relation $$R = c' \Delta t_r / 2, \qquad (1)$$

where $c'$ is the signal propagation velocity for an electromagnetic wave in the ambient medium for the frequency used by the radar gun and $\Delta t_r$ is the elapsed time between firing of the radar gun 46 and receipt thereat of a return signal reflected from the object 41. Assume that the offset Cartesian coordinates of the radar gun 46 relative to a selected point 40 (FIG. 1), such as the center of the baseline connected the two SATPS antennas 15 and 17, are known to be $(\Delta x_O, \Delta y_O, \Delta z_O)$ in whatever local coordinate system is used. The offset Cartesian coordinates of the object 41 relative to the selected reference point 40 then become $$\Delta x = \Delta x_o + R \cos(\phi + \phi_0) \cos\theta, \qquad (2)$$

$$\Delta y = \Delta y_o + R \sin(\phi + \phi_0) \cos\theta, \qquad (3)$$

$$\Delta z = \Delta z_o + R \sin\theta, \qquad (4)$$

where $\phi_0$ is a suitable reference azimuthal angle in the plane PL in which the azimuthal angle $\phi$ is measured. The offset computations set forth in Eqs. (2), (3) and (4) apply no matter what ARM device is used to determine the relevant angles and range.

Figure 3:
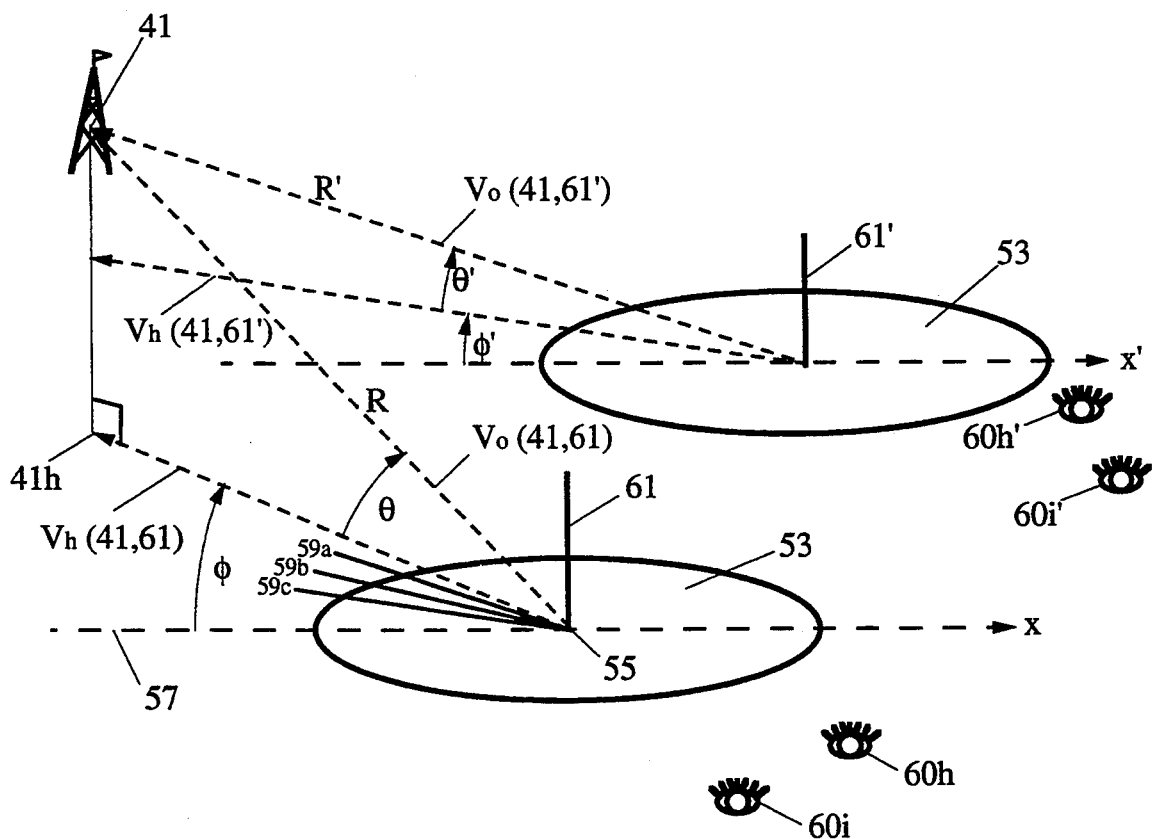

FIG. 3 illustrates another suitable location determination apparatus 51 for determination of the aximuthal angel $\phi$ and/or polar angle $\theta$ of the object 41 and range R to the object relative to the mobile station 13. The apparatus 51 includes a plane surface 53 that is approximately parallel to the local tangent plane of the Earth's surface at the mobile station site. The plane surface 53 has a center 55, a reference line 57 preferably passing through the center 55, and a plurality of straight lines 59a, 59b, 59c, etc. radiating from the center 55 representing various azimuthal angles $\phi$ relative to the reference line 57. Using a vertical sighting guide 61 positioned at the center 55, the object 41 (or its vertical projection 41h on the local tangent plane) is visually sighted or aligned 60i (or 60h). The azimuthal angle $\phi$ of a horizontally oriented vector $V_h(41, 61)$ extending between the sighting guide 61 and the vertical projection 41h of the object 41 on a local tangent plane is determined and recorded, stored, displayed and/or transmitted for subsequent use. If the polar angle $\theta$ of the object 41 relative to the mobile station 13 is also needed, this angle can be determined using a vector $V_o(41, 61)$ (or $V_o(41, 61')$ for a second alignment configuration) lying in the plane defined by a vertical sighting guide 61 (or 61') and a vector $V_h(41, 61)$ (or $V_h(41, 61')$) and pointing directly at the object 41 or a target portion thereof. The polar angle $\theta$ can be defined as the angle between the vertical sighting guide 61 (or the vector $V_h(41, 61)$) and the vector $V_o(41, 61)$, as illustrated. The range R, or vector length $|V_o(41, 61)|$, from sighting guide 61 to object 41 is found by standard rangefinding techniques.

Figure 4:
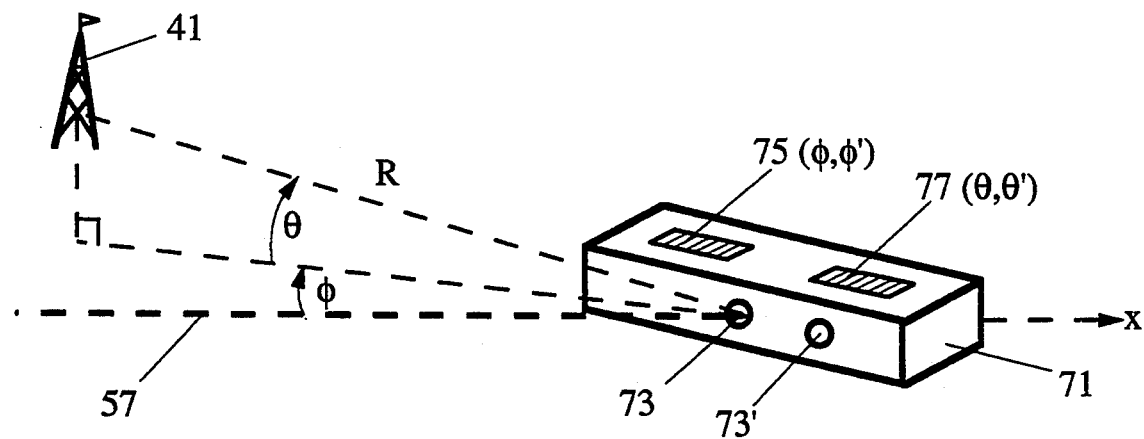

FIG. 4 illustrates another suitable location determination apparatus 71 for determination of the azimuthal angle $\phi$ and/or polar angle $\theta$ of the object 41 and range R to the object relative to the mobile station 13 in FIG. 1. The apparatus 71 includes a sighting tool 73 (or two adjacent sighting tools 73 and 73'), having a sighting center, that provides a view of part or all of the object 41 at a center of the sighting tool. The target portion of the object 41 is centered in the sighting tool 73, and the azimuthal and/or polar angles corresponding to the object are read out on one or two angle display meters 75 and 77 that are part of the apparatus 71.

The reference line 57 in FIG. 2 or 3 or 4 may be taken to coincide with the direction of the baseline 39 in FIG. 1. In this instance, the SATPS-determined location coordinates of the two SATPS antennas 15 and 17 determine the reference line 57. The reference line 57 need not pass through the designated center 55 (or sighting tool 73), if the offset distance and the offset direction between the center 55 and the reference line 57 are known.

Figure 5:
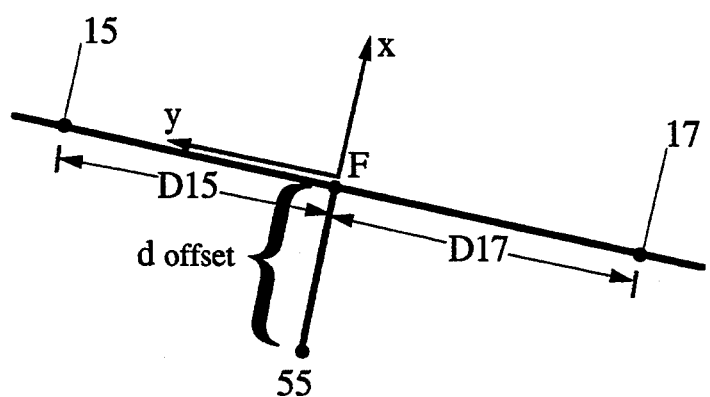
FIG. 5 illustrates use of a reference line or baseline defined by, or coinciding with, a line segment passing through the centers of the two SATPS antennas in FIG. 1.

Alternatively, as illustrated in FIG. 5, the offset distance $d_{offset}$ between the center 55 and the reference line 57, and the distances D15 and D17 from the perpendicular foot F to the respective SATPS antennas 15 and 17, may be known. Relative to a two-dimensional coordinate system (x, y) defined by the reference line 57 with origin at the foot F, the offset coordinates of the center 55 with respect to these two antennas become $$(\Delta x_{15}, \Delta y_{15}) = (-d_{offset}, D_{15}), \quad (5)$$

$$(\Delta x_{17}, \Delta y_{17}) = (-d_{offset}, D_{17}), \quad (6)$$

$$D_{15} + D_{17} = d. \quad (7)$$

Any other suitable coordinate system can also be used to express the offset coordinates of the center 55 and the SATPS antennas 15 and 17.

Figure 6:
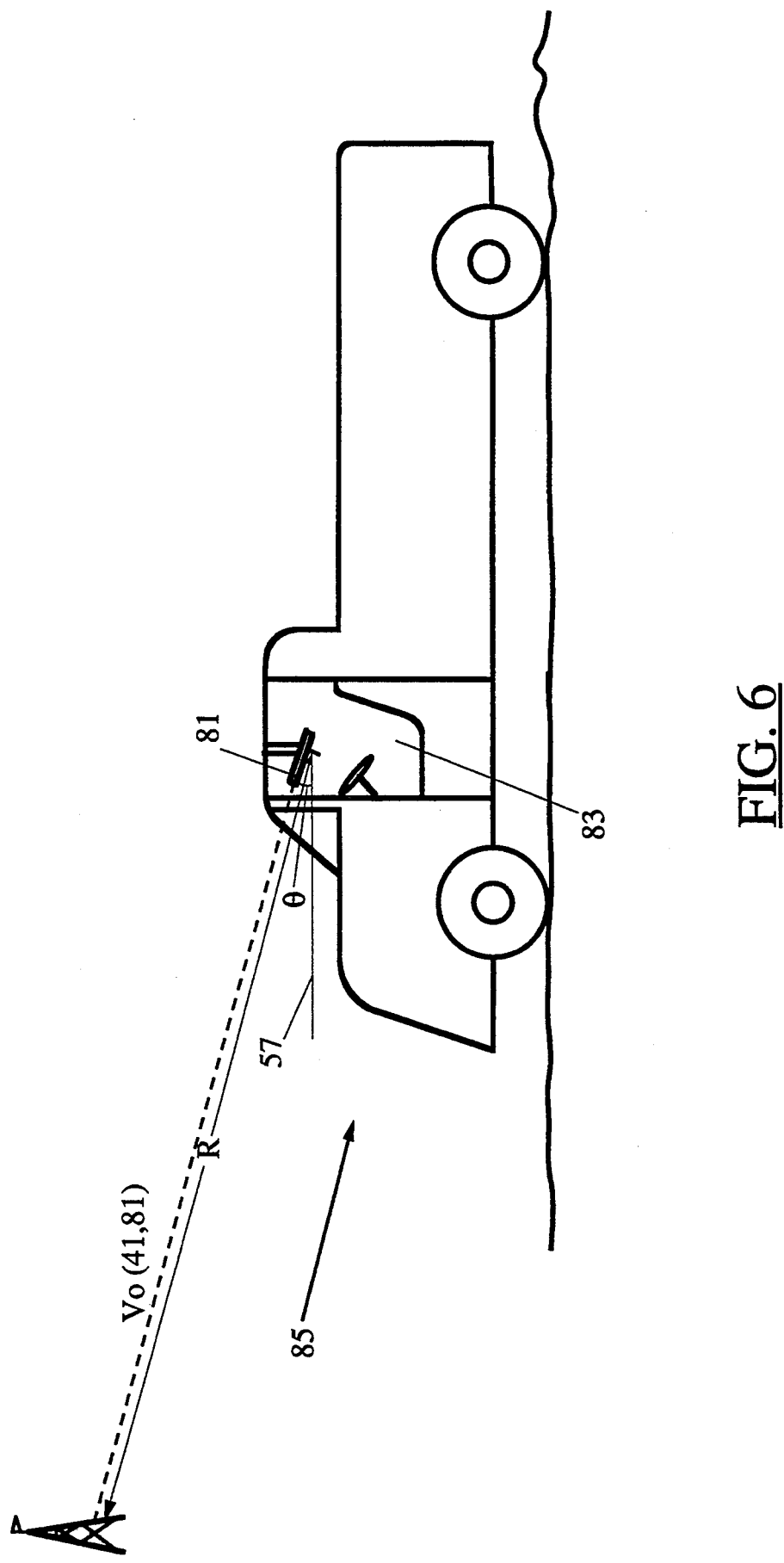
FIG. 6 illustrates an alternative to the embodiment shown in FIG. 1.

FIG. 1 illustrates an embodiment in which the location determination means or ARM devices 43 and/or 45 are mounted on a truck bed or similar site. Alternatively, a location determination means 81 can be provided within or adjacent to the cab or user-carrying portion 83 of a vehicle 85, illustrated in FIG. 6 with the vehicle door removed for clarity. In this instance, the apparatus user would stop the vehicle 85 and, without leaving the cab 83, would control the location determination means 81 to "sight" or obtain a visual fix on the object 41. Preferably, but not necessarily, the range R, the azimuthal angle $\phi$ and the polar angle $\theta$ (measured relative to a selected reference line 57) of a vector $V_o(41, 81)$ extending between the location determination means 81 and the object 41 would be determined.

Figure 7:
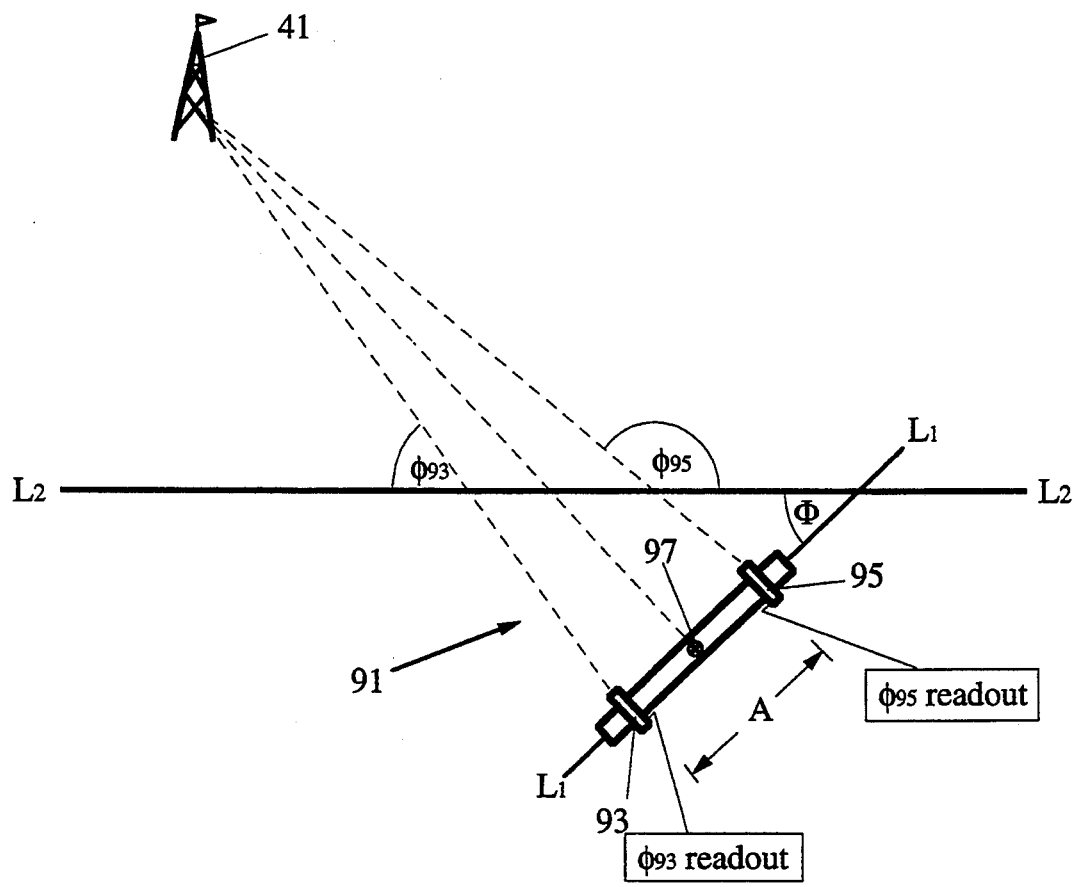
FIG. 7 illustrates range determination using binocular imaging apparatus with angle readout means.

In one embodiment, also illustrated in FIG. 7, the location determination means 81 includes a binocular rangefinder 91 having two independently operable optical or ultrasound objectives 93 and 95 that are spaced apart a known distance A and that are separately operable to bring images of the object 41 from the two objectives into coincidence. When these two images coincide, the azimuthal angles $\phi_{93}$ and $\phi_{95}$ associated with the orientations of the objectives are read out and used to determine the distances d(41, 93) and d(41, 95) from the respective objectives 93 and 95 to the object 41, according to the relations $$d(41,93) = A[\sin(\phi_{95} - \Phi)/\sin(\phi_{93} + \phi_{95})], \quad (8)$$

$$d(41,95) = A[\sin(\phi_{93} + \Phi)/\sin(\phi_{93} + \phi_{95})], \quad (9)$$

$$d(41,97) = (A/2)\{\cos[(\phi_{93} + \phi_{95})/2]/\sin(\phi_{93} + \Phi)\} \quad (10)$$
$$= (A/2)\{\cos[(\phi_{93} + \phi_{95})/2]/\sin(\phi_{95} - \Phi)\},$$

where $\phi$ is the angle between a baseline, such as L1, established by the two SATPS antennas and a selected reference line L2 in a horizontal plane. The angles $\theta_{93}$ and $\theta_{95}$ are read out from angular measuring devices 101 and 103 that are part of the rangefinder 91. One concern here is the accuracy of these angle readout values.

In an alternative approach, also illustrated in FIG. 7, the angular orientations of the two optical objectives 93 and 95 may be slaved together so that the azimuthal angles $\phi_{93}$ and $\phi_{95}$ satisfy the relation $$\theta_{93} = \pi - \phi_{95}. \quad (11)$$

In this instance, the distance d(41, 97) from the center 97 of the rangefinder 91 to the object 41 and the distance d(41, 93)=d(41, 95) are determined by the relations $$d(41, 93) = d(41, 95) = (A/2) \csc(\phi_{95} - \pi/2), \quad (12)$$

$$d(41, 97) = (A/2) \tan(\pi - \phi_{95}). \quad (13)$$

Optionally, the two optical or ultrasound objectives 93 and 95 in the rangefinder 91 in FIG. 7 may provided with a horizontal line that extends across that objective, with a polar angle readout device 105 and 107, respectively, for which a readout parameter $\theta_{107}=0$ corresponds to 0° tilt away from the horizon. A tilt by an angle of $\theta_{107}=74$ will produce a polar angle readout of this value on the readout device 107. The azimuthal angles and/or polar angle may be read out manually and/or stored in a memory for subsequent use in relations such as Eqs. (1)–(13).

Optionally, the two mobile unit GPS antennas 15 and 17 in FIG. 1 can be aligned so that the baseline 39 that extends between these antennas: (1) points directly toward the object 41; or (2) is oriented at a selected angle (e.g., 30° or 90°) relative to a horizontal line passing through the vertical projection 41h in FIG. 3. In any of the embodiments above, the rangefinder can be positioned on the baseline 39 or can be displaced from the baseline.

Figure 8:
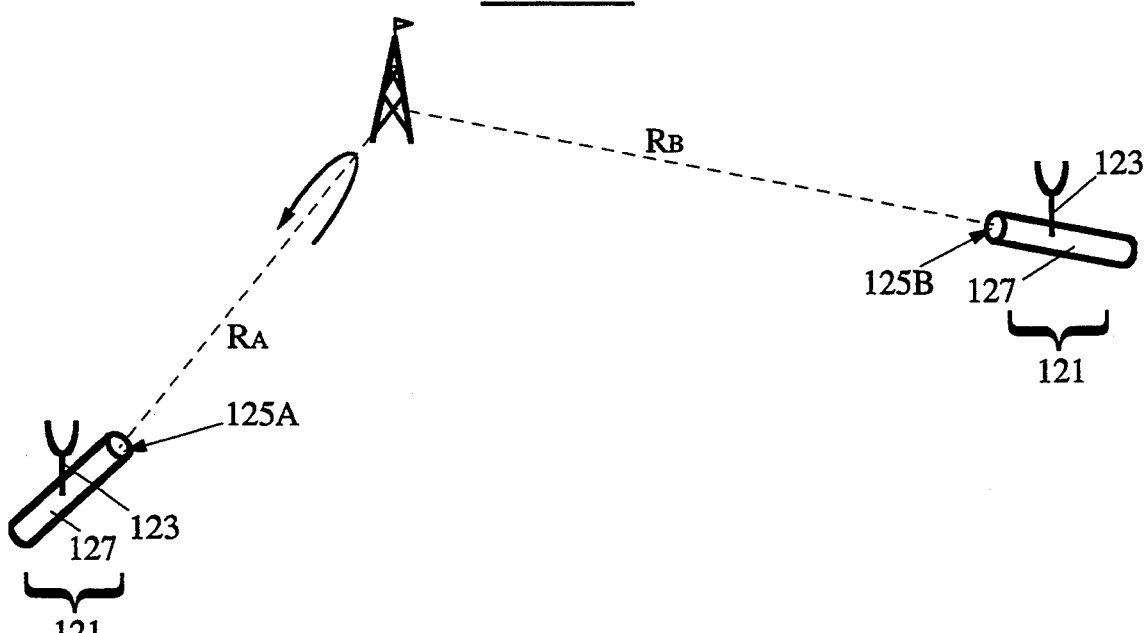
FIG. 8 illustrates an alternative to the rangefinder approach shown in FIG. 7.

FIG. 8 illustrates an approach to object location that does not require determination of azimuthal or polar angles. A mobile SATPS station 121, which may use a single SATPS antenna 123 or more than one such antenna, is sequentially positioned at locations 125A and 125B and determines the ranges $R_A$ and $R_B$; respectively, from a rangefinder 127 to the object 41. Here, the user might use a radar-type gun that determines range to a signal-reflecting object 41 but need not provide angle orientation information for the radar-type gun. Assuming that the object 41 is located on the surface of a reference geoid, triangulation using the ranges $R_A$ and $R_B$ at the respective locations 125A and 125B yields two possible locations, a correct location and a specious location, for the object 41. The specious location can be deleted by use of one additional information item, such as specification of whether the object lies generally north, generally east, generally south or generally west of one of the locations 125A or 125B. With the SATPS station positioned at each of the locations 125A and 125B, a sequence of objects such as 41 can be determined contemporaneously, using this triangulation approach. Preferably, the mobile SATPS station 121 would also communicate with a reference station, such as 29 in FIG. 1, to utilize differential SATPS corrections in determining the locations 125A and 125B with acceptable accuracy (preferably to within one meter) at the mobile station 121 or at the reference station 29.

A Satellite Positioning System (SATPS) is a system of satellite signal transmitters, with receivers located on the Earth's surface or adjacent to the Earth's surface, that transmits information from which an observer's present location and/or the time of observation can be determined. Two operational systems, each of which qualifies as an SATPS, are the Global Positioning System and the Global Orbiting Navigational System.

The Global Positioning System (GPS) is part of a satellite-based navigation system developed by the United States Defense Department under its NAVSTAR satellite program. A fully operational GPS includes up to 24 satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchoronous, with 0.5 sideral day (11.967 hours) orbital time intervals, so that the satellites move with time relative to the Earth below. Theoretically, five or more GPS satellites will be visible from most points on the Earth's surface, and visual access to three or more such satellites can be used to determine an observer's position anywhere on the Earth's surface, 24 hours per day. Each satellite carries cesium and/or rubidium atomic clocks to provide timing information for the signals transmitted by the satellites. Internal clock correction is provided for each satellite clock.

Each GPS satellite transmits two spread spectrum, L-band carrier signals: an L1 signal having a frequency f1=1575.42 MHz and an L2 signal having a frequency f2=1227.6 MHz. These two frequencies are integral multiples f1=1540 f0 and f2=1200 f0 of a base frequency f0=1.023 MHz. The L1 signal from each satellite is binary phase shift key (BPSK) modulated by two pseudo-random noise (PRN) codes in phase quadrature, designated as the C/A-code and P-code. The L2 signal from each satellite is BPSK modulated by only the C/A-code. The L1 signal, modulated by the P-code, can also be used here. The nature of these PRN codes is described below.

One motivation for use of two carrier signals L1 and L2 is to allow partial compensation for propagation delay of such a signal through the ionosphere, which delay varies approximately as the inverse square of signal frequency f(delay $\propto$ f$^{-2}$). This phenomenon is discussed by MacDoran in U.S. Pat. No. 4,463,357, which discussion is incorporated by reference herein. When transit time delay through the ionosphere is determined, a phase delay associated with a given carrier signal can be determined.

Use of the PRN codes allows use of a plurality of GPS satellite signals for determining an observer's position and for providing navigation information. A signal transmitted by a particular GPS signal is selected by generating and matching, or correlating, the PRN code for that particular satellite. All PRN codes are known and are generated or stored in GPS satellite signal receivers carried by ground observers. A first PRN code for each GPS satellite, sometimes referred to as a precision code or P-code, is a relatively long, fine-grained code having an associated clock or chip rate of 10 f0=10.23 MHz. A second PRN code for each GPS satellite, sometimes referred to as a clear/acquisition code or C/A-code, is intended to facilitate rapid satellite signal acquisition and hand-over to the P-code and is a relatively short, coarser-grained code having a clock or chip rate of f0=1.023 MHz. The C/A-code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7.000 days) before this code portion repeats. Accepted methods for generating the C/A-code and P-code are set forth in the document GPS Interface Control Document ICD-GPS-200, published by Rockwell International Corporation, Satellite Systems Division, Revision A, 26 Sep. 1984, which is incorporated by reference herein.

The GPS satellite bit stream includes navigational information on the ephemeris of the transmitting GPS satellite and an almanac for all GPS satellites, with parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in Tom Logsdon, *The NAVSTAR Global Positioning System*, Van Nostrand Reinhold, New York, 1992, incorporated by reference herein.

An SATPS antenna receives SATPS signals from a plurality (preferably four or more) of SATPS satellites and passes these signals to an SATPS signal receiver/processor, which (1) identified the SATPS satellite source for each SATPS signal, (2) determines the time at which each identified SATPS signal arrives at the antenna, and (3) determines the present location of the SATPS antenna from this information and from information on the ephemerides for each identified SATPS satellite. The SATPS signal antenna and signal receiver/processor are part of the user segment of a particular SATPS, the Global Positioning System, as discussed by Tom Logsdon, op. cit.

A second configuration for global positioning is the Global Orbiting Navigation Satellite System (GLONASS), placed in orbit by the former Soviet Union and now maintained by the Russian Republic. GLONASS also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of 8/17 of a sideral day (11.26 hours). A GLONASS satellite and a GPS satellite and a GPS satellite will thus complete 17 and 16 revolutions, respectively, around the Earth every 8 days. The GLONASS system uses two carrier signals L1 and L2 with frequencies of f1=(1.602+9 k/16) GHz and f2=(1.246+7 k/16) GHZ, where k(=0, 1, 2, ... 23) is the channel or satellite number. These frequencies lie in two bands at 1.597–1.617 GHz (L1) and 1,240–1,260 (GHz (L2). The L1 code is modulated by a C/A-code (chip rate=0.511 MHz) and by a P-code (chip rate=5.11 MHz). The L2 code is presently modulated only by the P-code. The GLONASS satellites also transmit navigational data at at rate of 50 Baud. Because the channel frequencies are distinguishable from each other, the P-code is the same, and the C/A-code is the same, for each satellite. The methods for receiving and analyzing the GLONASS signals are similar to the methods used for the GPS signals.

Reference to a Satellite Positioning System or SATPS herein refers to a Global Positioning System, to a Global Orbiting Navigation Satellite System, and to any other compatible satellite-based system that provides information by which an observer's position and the time of observation can be determined, all of which meet the requirements of the present invention.

A Satellite Positioning System (SATPS), such as the Global Positioning System (GPS) or the Global Orbiting Navigation Satellite System (GLONASS), uses transmission of coded radio signals, with the structure described above, from a plurality of Earth-orbiting satellites. A single passive receiver of such signals is capable of determining receiver absolute position in an Earth-centered, Earth-fixed coordinate reference system utilized by the SATPS.

A configuration of two or more receivers can be used to accurately determine the relative positions between the receivers or stations. This method, known as differential positioning, is far more accurate than absolute positioning, provided that the distances between these stations are substantially less than the distances from these stations to the satellites, which is the usual case. Differential positioning can be used for survey or construction work in the field, providing location coordinates and distances that are accurate to within a few centimeters.

In differential position determination, many of the errors in the SATPS that compromise the accuracy of absolute position determination are similar in magnitude for stations that are physically close. The effect of these errors on the accuracy of differential position determination is therefore substantially reduced by a process of partial error cancellation.

We claim:

1. Apparatus for accurately determining the location of a designated object from a position spaced apart from the object, without requiring that the object be approached, the apparatus comprising:
  a first SATPS station whose location is known with high accuracy, the first station comprising:
    a first SATPS antenna to receive SATPS signals from a plurality of SATPS satellites;
    a first SATPS receiver/processor, connected to the first SATPS antenna, to receive the SATPS signals from the first SATPS antenna, to determine the location of the first SATPS antenna and to determine an SATPS location correction that is the difference between the SATPS-determined location of the first SATPS antenna and the known location for the first SATPS antenna; and
    a correction signal transmitter, connected to the first SATPS receiver/processor, to receiver and transmit the SATPS location correction information;
  a mobile second SATPS station comprising:
    second and third SATPS antennas, positioned a known separation distance d apart, to receive SATPS signals from a plurality of SATPS satellites;
    a correction signal receiver, connected to the second SATPS receiver/processor, to receive the SATPS location correction information from the first SATPS station; and
    a second SATPS receiver/processor, connected to the second SATPS antenna and to the correction signal receiver, to receive the SATPS signals from the first SATPS antenna, to receive the SATPS location correction information from the correction signal receiver, to determine the location of the second and third SATPS antennas and to correct the SATPS-determined location of at least one of the second and third SATPS antennas, using the SATPS location correction information; and
  location determination means, located adjacent to the second or third SATPS antenna, for determining the length of an object vector and the angular orientation of the object vector relative to a selected reference line passing adjacent to the second and third SATPS antennas, where the object vector extends from the location determination means to the designated object.

2. The apparatus of claim 1, wherein said second station is mounted on a vehicle that can be moved along a selected curve or within a selected two-dimensional region.

3. The apparatus of claim 1, wherein said second station is portable and can be carried by a human being along a selected curve or within a selected two-dimensional region.

4. The apparatus of claim 1, wherein said location determination means comprises:
  a radar-type gun that may be pointed at an object, that emits an electromagnetic signal that relatively small angular divergence when fired, and that determines the distance R from the radar-type gun to the object approximately by the relation $R = c' \Delta t_r / 2$, where $c'$ is the signal propagation velocity in an ambient medium in which the radar-type gun is fired and $\Delta t_r$ is the elapsed time between firing of the radar-type gun receipt of a return signal at the gun; and
  angle readout means for determining the angle between said selected reference line and said object vector.

5. The apparatus of claim 1, wherein said location determination means comprises:
  an optical, electro-optical or ultrasonic rangefinder having first and second optical objectives that are spaced apart form each other, for determining the distance from said location determination means to said designated object; and
  angle readout means for determining the angle between said selected reference line and said object vector and for determining the angle between said selected reference line and a line drawn from each of the first and second optical objectives.

6. The apparatus of claim 1, wherein said SATPS signals are electromagnetic signals with a characteristic wavelength $\lambda$ and said separation distance d satisfies the relation $d > \lambda$.

7. The apparatus of claim 1, wherein said selected reference line passes through at least one of said second and third SATPS antennas.

8. The apparatus of claim 1, wherein said selected reference line passes at a fixed, non-zero angle through a line drawn through said second and third SATPS antennas.

9. The apparatus of claim 1 wherein said reference line passes through at least one of said second and third SATPS antennas.

10. Apparatus for accurately determining the location of a designated object from a position spaced apart from the object, without requiring that the object be approached, the apparatus comprising:
a first SATPS station whose location is known with high accuracy, the first station comprising:
a first SATPS antenna to receive SATPS signals from a plurality of SATPS satellites; and
a first SATPS receiver/processor, connected to the first SATPS antenna, to receive the SATPS signals from the first SATPS antenna, to determine the location of the first SATPS antenna, to determine an SATPS location correction that is the difference between the SATPS-determined location of the first SATPS antenna and the known location for the first SATPS antenna, to receive information on and determine the location of one or more other SATPS signal antennas, and to correct the locations of these other SATPS signal antennas, using the SATPS location correction information for the first SATPS antenna;
a mobile second SATPS station comprising:
second and third SATPS antennas, positioned a known separation distance d apart, to receive SATPS signals from a plurality of SATPS satellites; and
a second SATPS receiver/processor, connected to the second SATPS antenna, to receive the SATPS signals from the second and third SATPS antennas and to store this information; and
location determination means, located adjacent to the second or third SATPS antenna, for determining and storing the length of an object vector and the angular orientation of the object vector relative to a selected reference line defined with reference to a selected second line passing adjacent to the second and third SATPS antennas, where the object vector extends from the location determination means to the designated object.

11. The apparatus of claim 10, wherein said second station is mounted on a vehicle that can be moved along a selected curve or within a selected two-dimensional region.

12. The apparatus of claim 10, wherein said second station is portable and can be carried by a human being along a selected curve or within a selected two-dimensional region.

13. The apparatus of claim 10, wherein said location determination means comprises:
radar-type gun that may be pointed at an object, that emits an electromagnetic signal with relatively small angular divergence when fired, and that determines the distance R from the radar-type gun to the object approximately by the relation $R = c' \Delta t_r / 2$, where $c'$ is the signal propagation velocity in an ambient medium in which the radar-type gun is fired and $\Delta t_r$ is the elapsed time between firing of the radar-type gun receipt of a return signal at the gun;
angle readout means for determining the angle between said selected reference line and said object vector.

14. The apparatus of claim 10, wherein said location determination means comprises:
an optical, electro-optical or ultrasonic rangefinder having first and second optical objectives that are spaced apart from each other, for determining the distance from said location determination means to said designated object; and
angle readout means for determining the angle between said selected reference line and said object vector and for determining the angle between said selected reference line and a line drawn from each of the first and second optical objectives.

15. The apparatus of claim 10, wherein said SATPS signals are electromagnetic signals with a characteristic wavelength $\lambda$ and said separation distance d satisfies the relation $d > \lambda$.

16. The apparatus of claim 10, wherein said selected reference line passes through at least one of said second and third SATPS antennas.

17. The apparatus of claim 10, wherein said selected reference line passes at a fixed, non-zero angle through a line drawn through said second and third SATPS antennas.

18. The apparatus of claim 10, wherein said second SATPS station further comprises a location signal transmitter to transmit information on said SATPS locations of said second and third SATPS antennas;
wherein said first SATPS station further comprises a signal receiver, connected to said first SATPS receiver/processor, to receive the information on said SATPS locations of said second and third SATPS antenna transmitted by the location signal transmitter; and
wherein said first SATPS determines and provides correction values for said locations of said second and third SATPS antennas, using said SATPS location correction information for said first SATPS antenna.

19. The apparatus of claim 10, further comprising download means, connectable to said first SATPS receiver/processor, and to at least one of said second SATPS signal receiver/processor and said location determination means, for transferring information on said locations of said second and third SATPS antennas and information on said location of said designated object relative to said location determinations means to said first SATPS receiver/processor.

20. The apparatus of claim 10, wherein said line passing adjacent to said second and third SATPS antennas is oriented at a selected angle relative to a line extending from a point on this line to said designated object.

21. Apparatus for accurately determining the location of a designated object from a position spaced apart from the object, without requiring that the object be approached, the apparatus comprising:
a first SATPS station whose location is known with high accuracy, the first station comprising:
a first SATPS antenna to receive SATPS signals from a plurality of SATPS satellites;
a first SATPS receiver/processor, connected to the first SATPS antenna, to receive the SATPS signals from the first SATPS antenna, to determine the location of the first SATPS antenna and to determine an SATPS location correction that is the difference between the SATPS-determined location of the first SATPS antenna and the known location for the first SATPS antenna; and a correction signal transmitter, connected to the first SATPS receiver/processor, to receive and transmit the SATPS location correction information;

a mobile second SATPS station comprising:

second and third SATPS antennas, positioned a known separation distance d apart, to receive SATPS signals from a plurality of SATPS satellites;

a correction signal receiver, connected to the second SATPS receiver/processor, to receive the SATPS location correction information from the first SATPS station;

a second SATPS receiver/processor, connected to the second SATPS antenna and to the correction signal receiver, to receive the SATPS signals from the first SATPS antenna, to receive the SATPS location correction information from the correction signal receiver, to determine the location of the second and third SATPS antennas and to correct the SATPS-determined location of at least one of the second and third SATPS antennas, using the SATPS location correction information; and location determination means, located adjacent to the second or third SATPS antenna, for determining the length of an object vector that extends from the location determination means to the designated object, the location determination means comprising:

a radar-type gun, located adjacent to the second or third SATPS antenna, that may be pointed at an object, that emits an electromagnetic signal with relatively small angular divergence when fired, and the determines the distance R from the radar-type gun to the object approximately by the relation $R = c' \Delta t_r / 2$, where $c'$ is the signal propagation velocity in an ambient medium in which the radar-type gun is fired and $\Delta t_r$ is the elapsed time between firing of the radar-type gun receipt of a return signal at the gun; and triangulation means, connected to the radar-type gun and to the second SATPS receiver/processor, for receiving the distances R measured to the designated object from each of two spaced apart locations of the radar-type gun and information on these two locations and for determining the location of the designated object by triangulation.

22. The apparatus of claim 21, wherein said second station is mounted on a vehicle that can be moved along a selected curve or within a selected two-dimensional region.

23. The apparatus of claim 21, wherein said second station is portable and can be carried by a human being along a selected curve or within a selected two-dimensional region.

24. The apparatus of claim 21, wherein said SATPS signals are electromagnetic signals with a characteristic wavelength $\lambda$ and said separation distance d satisfies the relation $d > \lambda$.

25. The apparatus of claim 21, wherein said line passing through said second and third SATPS antennas is oriented at a selected angle relation to a line extending from a point on this line to said designated object.

26. Apparatus for accurately determining the location of a designated object from a position spaced apart from the object, without requiring that the object be approached, the apparatus comprising:

a first SATPS station whose location is known with high accuracy, the first station comprising:

a first SATPS antenna to receive SATPS signals from a plurality of SATPS satellites; and a first SATPS receiver/processor, connected to the first SATPS antenna, to receive the SATPS signals from the first SATPS antenna and to determine the location of the first SATPS antenna, to determine an SATPS location correction that is the difference between the SATPS-determined location of the first SATPS antenna and the known location for the first SATPS antenna, to receive information on and determine the location of one or more other SATPS signal antennas, and to correct the locations of these other SATPS signal antennas, using the SATPS location correction information for the first SATPS antenna;

a mobile second SATPS station comprising:

second and third SATPS antennas, positioned a known separation distance d apart, to receive SATPS signals from a plurality of SATPS satellites; and a second SATPS receiver/processor, connected to the second SATPS antenna, to receive the SATPS signals from the second and third SATPS antennas and to store this information; and location determination means, located adjacent to the second or third SATPS antenna, for determining the length of an object vector that extends from the location determination means to the designated object, the location determination means comprising:

a radar-type gun, located adjacent to the second or third SATPS antenna, that may be pointed at an object, that emits an electromagnetic signal with relatively small angular divergence when fired, and that determines the distance R from the radar-type gun to the object approximately by the relation $R = c' \Delta t_r / 2$, where $c'$ is the signal propagation velocity in an ambient medium in which the radar-type gun is fired and $\Delta t_r$ is the elapsed time between firing of the radar-type gun receipt of a return signal at the gun; and triangulation means, connected to the radar-type gun and to the second SATPS receiver/processor, for receiving the distances R measured to the designated object from each of two spaced apart locations of the radar-type gun and information on these two locations and for determining the location of the designated object by triangulation.

27. The apparatus of claim 26, wherein said second station is mounted on a vehicle that can be moved along a selected curve or within a selected two-dimensional region.

28. The apparatus of claim 26, wherein said second station is portable and can be carried by a human being along a selected curve or within a selected two-dimensional region.

29. The apparatus of claim 26, wherein said SATPS signals are electromagnetic signals with a characteristic wavelength $\lambda$ and said separation distance d satisfies the relation $d > \lambda$.

30. The apparatus of claim 26, wherein said second SATPS station further comprises a location signal transmitter to transmit information on said SATPS locations of said second and third SATPS antennas;

wherein said first SATPS station further comprises a signal receiver, connected to said first SATPS receiver/processor, to receive the information on said SATPS locations of said second and third SATPS antenna transmitted by the location signal transmitter; and wherein said first SATPS determines and provides correction values of said locations of said second and third SATPS antennas, using said SATPS location correction information for said first SATPS antenna.

31. The apparatus of claim 26, further comprising download means, connectable to said first SATPS receiver/processor, and to at least one of said second SATPS signal receiver/processor and said location determination means, for transferring information on said locations of said second and third SATPS antennas and information on said location of said designated object relative to said location determinations means to said first SATPS receiver/processor.

32. The apparatus of claim 26, wherein said line passing through said second and third SATPS antennas is oriented at a selected angle relative to a line extending from a point on this line to said designated object.

* * * * *